& nbsp;

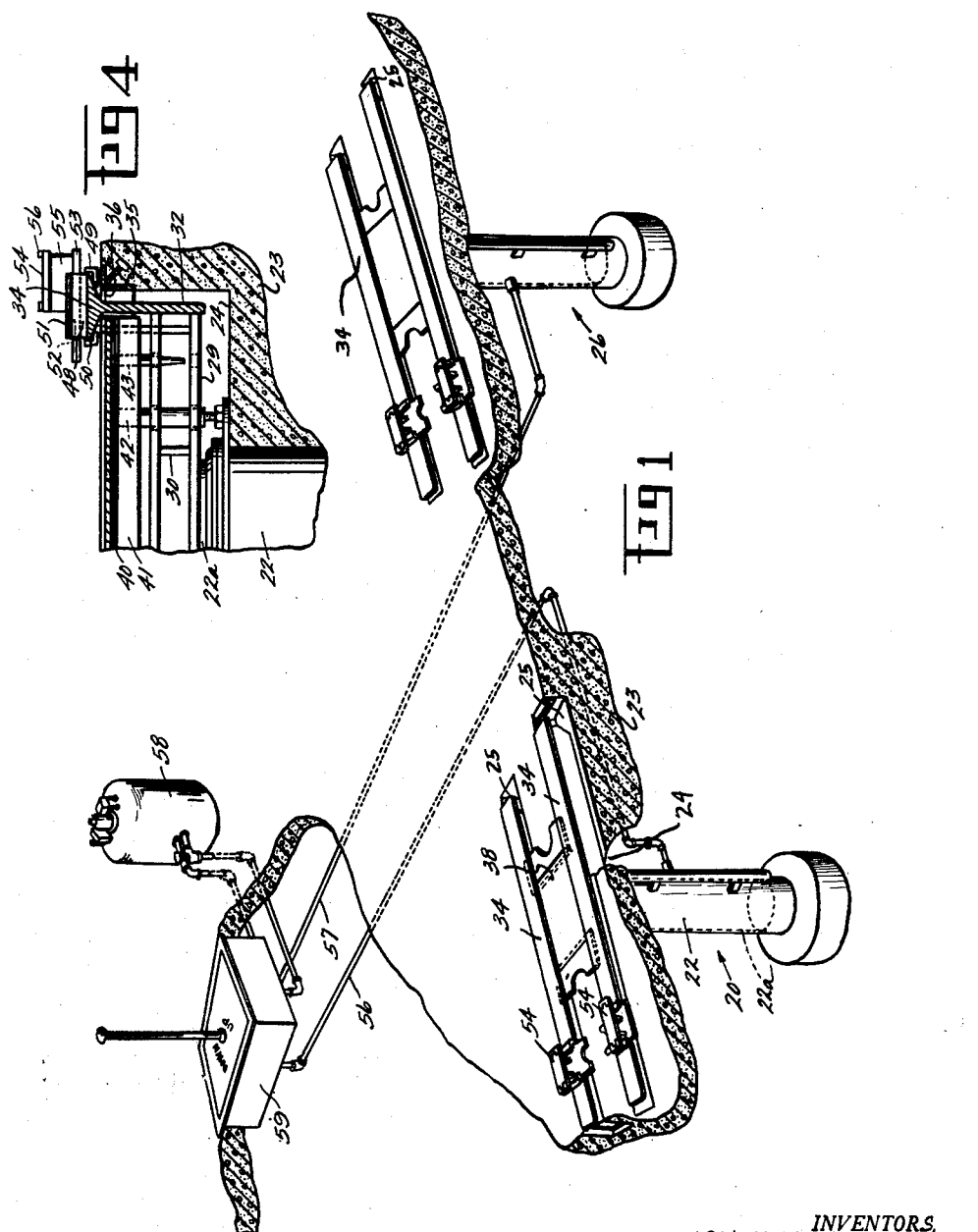

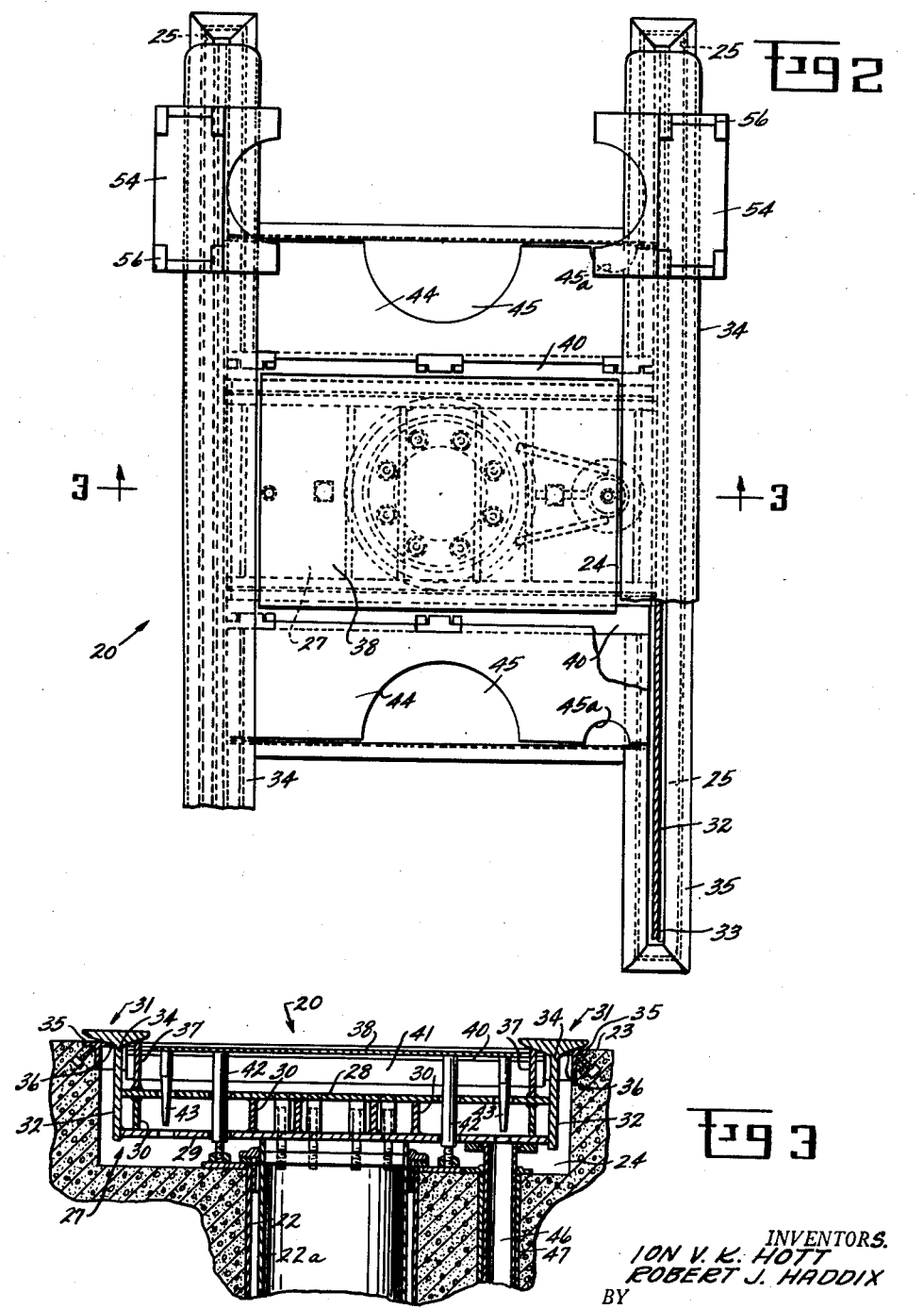

United States Patent Office 2,708,987
Patented May 24, 1955

2,708,987
VEHICLE LIFT, RAIL TYPE SUPERSTRUCTURE

Ion V. K. Hott and Robert J. Haddix, Dayton, Ohio, assignors to The Joyce-Cridland Company, Dayton, Ohio, a corporation of Ohio Original application September 29, 1948, Serial No. 51,668, now Patent No. 2,681,077, dated June 15, 1954. Divided and this application September 5, 1951, Serial No. 245,170

8 Claims. (Cl. 187—8.61)

This invention relates to vehicle lifts and more particularly to multipost lifts for busses, trucks and other vehicles, and is a division of the application filed by us September 29, 1948, Serial No. 51,668, now Patent No. 2,681,077 granted June 15, 1954.

One object of the invention is to provide a vehicle lift of such character and so installed in a floor that when the lift is not in use the floor will be free from obstructions or openings which would materially restrict the use of the floor or render that use hazardous.

It has been proposed heretofore to provide a vehicle lift in which the load supporting structure was substantially at floor level when in its lowered position but the lifts so provided have, for the most part at least, been unsatisfactory in operation or the construction and installation thereof have been such as to result in a substantially increased expense. It is therefore a further object of the invention to provide such a lift which can be produced and installed at a relatively low cost and will be entirely satisfactory in operation.

A further object of the invention is to provide a lifting mechanism having a superstructure of the rail type in which the heads of the rails are in contact with the floor when in their lowermost positions and in which removable axle engaging devices may be mounted on the rail heads and adjusted with relation thereto while said rails are in said lowermost positions.

Other objects of the invention may appear as the invention is described in detail.

In the accompanying drawings Fig. 1 is a schematic view of a vehicle lift embodying our invention; Fig. 2 is a top plan view, partly broken away, of a rail type superstructure for a lifting mechanism; Fig. 3 is a section taken on the line 4—4 of Fig. 2; and Fig. 4 is a sectional view on a larger scale of a portion of said superstructure showing the axle engaging device on the rail.

In these drawings we have illustrated one embodiment of the invention and have shown the same as applied to one lifting unit of a multipost lift, but it is to be understood that the lift as a whole, as well as the several parts thereof, may take various forms without departing from the spirit of the invention and that the invention may be embodied in vehicle lifts of various kinds.

In the embodiment illustrated in Fig. 1 of the drawings the invention is embodied in a two-post vehicle lift, including two lifting units, 20 and 26, adapted to support respectively the front and rear axles of a vehicle. Each unit is here shown as comprising a single lifting mechanism but, if desired, one unit may comprise a plurality of lifting mechanisms, as shown in the above mentioned application. Either lifting unit may be the front unit and the other the rear unit, but for the purpose of this description the unit 20 will be designated as the front lifting unit. The two lifting units are similar in construction and in the mounting thereof and the description of one unit will apply to the second unit. The front unit 20 will be designated as it is shown in full detail.

As shown in the drawings the front lifting unit 20 comprises a cylinder 22 supported below a shallow pit in the floor 23. The pit is open at its upper end and comprises a central portion 24 of substantial width and relatively narrow portions 25 at both sides of the larger portion and extending forwardly and rearwardly beyond the latter. These narrow openings or slots in the floor are preferably of a width materially less than the width of the sole or heel of a man's shoe, to prevent any part of a shoe entering or being caught in the slot. The upper end of the cylinder 22 extends into the bottom of the larger portion 24 of the pit and is rigidly supported therein. Mounted in the cylinder 22 is a piston or lifting element 22a the upper end of which extends above the cylinder and is rigidly secured to a cross member 27 which is located in the larger portion of the pit and below the floor surface when the lifting element is in its lowermost position. The cross member is here shown as comprising upper and lower plates 28 and 29 spaced one from the other and rigidly connected by vertical ribs 30 rigidly secured thereto, as by welding. The thickness of the cross member is substantially less than the depth of the portion 24 of the pit and the upper plate 28 is therefore spaced substantially below the floor surface when the lifting element is in its lower position. Rigidly secured to the respective sides of the cross member 27 are rails 31, each rail comprising a relatively thin vertical web 32 adapted to move into and out of the narrow portions 25 of the pit through narrow openings or slots 33 in the floor, and a head 34 extending laterally beyond both sides of the web and of a width substantially greater than the width of the slot 33. Preferably the pit is provided along each side thereof with a metallic bar 35, partially embedded in the concrete of the floor and here shown as T-shaped in cross section, the inner flanges 36 of the bars at the respective sides of the narrow portions of the pit extending inwardly to form the narrow openings 33 and being spaced one from the other a distance slightly greater than the thickness of the webs 32. The flanges 36 of the outer bars 35 extend along the sides of the larger portion of the pit and have engagement with the outer flanges only of the respective rail heads, the inner flanges being preferably braced by upright webs 37 rigidly secured to the cross member. When the cross member is in its lowermost position, as shown in Fig. 3, the thin portions 32 of the rails extend into the pit and the lower portions of the rail heads are in contact with the flanges 36, which form part of the floor surface, and remain above the floor surface, but these rail heads are of relatively thin construction, being usually less than an inch in thickness, so that they do not extend above the floor surface far enough to interfere with the movement of vehicles or persons over the floor surface when the lift is not in use.

Supported on the cross member 27 is a closure plate 38 which is slightly smaller in dimensions than the pit 24 and is adapted to be supported, when the cross member is in its lowermost position, on ledges 40 formed by angle bars 41 rigidly secured to the floor at the front and rear ends of the large portion of the pit, the ledges being spaced below the floor surface a distance approximating the thickness of the closure plate. The intermediate portion of the closure plate, when in this lower position, is supported by studs 42 mounted on the bottom of the pit 24 and extending through openings in the cross member. The closure plate is connected with the cross member by tapered studs 43 rigidly secured thereto and extending downwardly through openings in the upper plate of the cross member to hold the closure plate against lateral displacement with relation to the cross member. When the lifting element and cross member move upwardly the closure plate moves with the same and other means are provided for closing the top of the large portion 24 of the pit when the lifting element is in its elevated position and thus providing a substantially continuous floor surface under the elevated vehicle over which the operator may move in safety while servicing the vehicle, the openings 33 being so narrow as to present no hazard. As here shown this last mentioned closure comprises doors 44 which are hinged at their edges to the floor adjacent the front and rear ends of the wide portion of the pit and normally lie flat on the surface of those portions of the floor which are between the narrow portions of the pit, which are preferably slightly depressed to support the doors flush with the floor. Each door is provided in its free edge portion with an approximately semi-circular recess 45 of a diameter slightly greater than the diameter of the cylindrical lifting element so that after the lifting element has been elevated the doors may be swung into position over the open end of the pit. In the present arrangement the lifting element is provided with a downwardly extending tubular member 46 which slides in a guideway 47 parallel with the cylinder 22 to hold the lifting element against rotation, and the doors are provided with other recesses 45a to receive this member. Thus the floor is substantially continuous and unobstructed when the lifting element is in either its lowermost position or its elevated position.

Each of the rail heads is adapted to receive and support an axle engaging device which is adjustable lengthwise thereof to accommodate the same to vehicles having different wheel bases. These axle engaging devices are removably attached to the rail heads and may be removed therefrom when the lift is not in use, to avoid obstructions on the floor. They may take various forms but in the present instance each device comprises a base 48 adapted to rest upon the top surface of the rail head and having on each side of the rail head downwardly extending parts 49 having opposed channels 50 to receive the respective edge portions of the rail head. The rail head is of such shape that the lower surfaces of the lateral portions thereof are spaced from the floor surface a distance sufficient to permit the lower portions of the channeled members to extend between the same and the floor. In the present instance the lower surfaces of the lateral portions of each rail head are inclined upwardly and laterally. The base member 48 is also provided at its front and rear edges with upwardly extending parts 51 which extend transversely to the rail and have therein opposed channels 52. Slidably mounted in the channels is an axle engaging member which preferably comprises a plate 53 slidably mounted in the channels 52 and of a length substantially greater than the width of the rail head. An upper axle engaging plate 54 is rigidly secured to the plate 53 by upright members 55 so that it is supported above and out of contact with the upwardly extending parts of the base. This upper plate 54 is provided adjacent the corners thereof with upwardly extending projections or lugs 56 to locate the same with relation to the axle. Thus when the lift is to be used the axle engaging devices may be slipped onto the respective rails, at one end of the superstructure, and adjusted lengthwise of the latter to accommodate the same to the axle of the vehicle which is to be lifted before any upward movement has been imparted to the lifting mechanism.

Propellent fluid may be supplied to the two units in any suitable manner. As here shown the units are connected by conduits 56 and 57 with a source of oil supply 58 through a valve mechanism enclosed in a control box 59.

While we have shown and described one embodiment of our invention we wish it to be understood that we do not desire to be limited to the details thereof as various modifications may occur to a person skilled in the art.

Having now fully described our invention what we claim as new and desire to secure by Letters Patent is:

1. In a vehicle lift adapted to engage the axles of a motor vehicle, a floor structure having openings provided therein, the spacing of the openings being less than the distance between the wheels of a motor vehicle whereby a vehicle may be driven over the lift without contacting the same, a lifting element adapted to be mounted below the floor structure and movable through an opening in said floor structure, load supporting elements carried by said lifting element and each comprising a thin lower portion adapted to enter a narrow opening in said floor structure when said lifting element is moved to its lowermost position, and a thin and substantially horizontal upper portion of a width greater than the thickness of said lower portion to engage the surface of said floor structure and close said narrow opening when said lifting element is in said lowermost position.

2. In a vehicle lift adapted to engage the axles of a motor vehicle, a floor structure having openings provided therein, the spacing of the openings being less than the distance between the wheels of a motor vehicle whereby a vehicle may be driven over the lift without contacting the same, a lifting element adapted to be mounted below the floor structure for movement through an opening in said floor structure, a cross member supported on said lifting element for movement thereby through said opening, laterally spaced rails connected with said cross member for movement therewith and having thin upright lower portions movable into and out of long narrow openings in said floor structure and having upper portions of a width greater than the width of said narrow openings, said rails being so positioned with relation to said lifting element that when said lifting element is in its lowermost position the lower portions of said rails will extend into the respective narrow openings and the upper portions thereof will extend across and close said narrow openings, and a member carried by said cross member to close the first mentioned opening when said lifting element is in said lowermost position.

3. In a vehicle lift adapted to engage the axles of a motor vehicle, a floor structure having openings therein, the spacing of the openings being less than the distance between the wheels of a motor vehicle whereby a vehicle may be driven over the lift without contacting the same, a lifting element adapted to be mounted below the floor structure for movement through an opening in said floor structure, a cross member supported on said lifting element for movement thereby through said opening, laterally spaced rails connected with said cross member for movement therewith and having thin upright lower portions movable into and out of long narrow openings in said floor structure and having upper portions of a width greater than the width of said narrow openings, said rails being so positioned with relation to said lifting element that when said lifting element is in its lowermost position the lower portions of said rails will extend into the respective narrow openings and the upper portions thereof will extend across and close said narrow openings, a member carried by said cross member to close the first mentioned opening when said lifting element is in said lowermost position, and other means for closing said first mentioned opening when said lifting element is in an elevated position.

4. In a vehicle lift adapted to engage the axles of a motor vehicle, a floor structure having openings therein, the spacing of the openings being less than the distance between the wheels of a motor vehicle whereby a vehicle may be driven over the lift without contacting the same, a lifting element adapted to be mounted below the floor structure for movement through an opening in said floor structure, a cross member supported on said lifting element for movement thereby through said opening, laterally spaced rails connected with said cross member for movement therewith and having thin upright lower portions movable into and out of long narrow openings in said floor structure and having upper portions of a width greater than the width of said narrow openings, said rails being so positioned with relation to said lifting element that when said lifting element is in its lowermost position the lower portions of said rails will extend into the respective narrow openings and the upper portions thereof will extend across and close said narrow openings, a member carried by said cross member to close the first mentioned opening when said lifting element is in said lowermost position, and doors hinged to said floor adjacent the respective transverse edges of said first mentioned opening for movement to positions to close the latter when said lifting element is in an elevated position.

5. In a vehicle lift adapted to engage the axles of a motor vehicle, a floor structure having openings therein, the spacing of the openings being less than the distance between the wheels of a motor vehicle whereby a vehicle may be driven over the lift without contacting the same, a lifting element adapted to be mounted below the floor structure for movement through an opening in said floor structure, a cross member supported on said lifting element for movement thereby through said opening, laterally spaced rails connected with said cross member for movement therewith and having thin upright lower portions movable into and out of long narrow openings in said floor structure and having upper portions of a width greater than the width of said narrow openings, said rails being so positioned with relation to said lifting element that when said lifting element is in its lowermost position the lower portons of said rails will extend through the respective narrow openings and the upppper portions thereof will extend across and close said narrow openings, the lower surface of the head of each rail being shaped to space the lateral edge portions thereof from said floor surface when said rail is in its lowermost position, and means for closing the first mentioned opening when said rails are in said lowermost positions.

6. In a vehicle lift adapted to engage the axles of a motor vehicle, a floor structure having openings therein, the spacing of the openings being less than the distance between the wheels of a motor vehicle whereby a vehicle may be driven over the lift without contacting the same, a lifting element adapted to be mounted below the floor structure and movable through an opening in said floor structure, a load supporting element carried by said lifting element and comprising a thin lower portion adapted to enter a narrow opening in said floor structure when said lifting element is moved to its lowermost position, and a thin and substantially horizontal upper portion of a width greater than the thickness of said lower portion to engage the surface of said floor structure, and close said narrow opening when said lifting element is in said lowermost position, the lateral edges of said upper portion when in said lowermost position being spaced from the floor structure to permit an axle engaging device to be adjustably mounted thereon.

7. In a vehicle lift adapted to engage the axles of a motor vehicle, a floor structure having a pit and narrow slots therein, the spacing of the slots being less than the distance between the wheels of a motor vehicle whereby a vehicle may be driven over the lift without contacting the same, a lifting element adapted to be mounted below the pit beneath the surface of the floor structure for movement through said pit, a load supporting structure mounted on said lifting element for movement thereby into and out of said pit, said supporting structure including a rigid cross member secured to said lifting element and extending beyond both sides thereof, and a pair of laterally spaced rails supported by said cross member and extending forwardly and rearwardly therefrom, each rail having a thin upright lower portion rigidly secured to said cross member and adapted to extend into the narrow slots in the floor structure beyond the ends of said pit, each rail also having a head of a width greater than the width of said slots to movably support an axle engaging device, a member supported on said cross member between said rails and below the heads thereof to close said pit when said load supporting structure is in a lowered position, and means for actuating said lifting element.

8. In a vehicle lift adapted to engage the axles of a motor vehicle, a floor structure forming a pit and narrow slots therein, the spacing of the slots being less than the distance between the wheels of a motor vehicle whereby a vehicle may be driven over the lift without contacting the same, a lifting element adapted to be mounted below the pit beneath the surface of the floor structure for movement through said pit, a load supporting structure mounted on said lifting element for movement thereby into and out of said pit, said supporting structure including a rigid cross member secured to said lifting element and extending beyond both sides thereof, and a pair of laterally spaced rails supported by said cross member and extending forwardly and rearwardly therefrom, each rail having a thin upright lower portion rigidly secured to said cross member and adapted to extend into narrow slots in the floor structure beyond the ends of said pit, each rail also having a head of a width greater than the width of said slots to movably support an axle engaging device, a member supported on said cross member between said rails and below the heads thereof to close said pit when said load supporting structure is in a lowered position, and pit closing members having means whereby they may be supported on said floor structure for movement into pit closing positions when said load supporting structure is in an elevated position, and means for actuating said lifting element.

References Cited in the file of this patent

UNITED STATES PATENTS

| | | |
|---|---|---|
| 2,100,617 | Thompson | Nov. 30, 1937 |
| 2,262,121 | Snider | Nov. 11, 1941 |
| 2,458,986 | Frey | Jan. 11, 1949 |
| 2,464,731 | Thompson | Mar. 15, 1949 |
| 2,497,565 | Stark | Feb. 14, 1950 |